United States Patent Office 3,207,578
Patented Sept. 21, 1965

3,207,578
PROCESS FOR THE PREPARATION OF WATER-DISPERSIBLE FIBROUS ALUMINA MONOHYDRATE
Robert L. Brown, West Chester, Pa., and John Bugosh, Wilmington, Del., assignors to E. I. du Pont de Nemours and Company, Wilmington, Del., a corporation of Delaware
No Drawing. Filed June 11, 1964, Ser. No. 374,295
5 Claims. (Cl. 23—143)

This application is a continuation-in-part of our co-pending application Serial No. 229,157, filed October 8, 1962, now abandoned, which is a continuation-in-part of application Serial No. 170,781, filed February 2, 1962, now abandoned, which in turn is a continuation-in-part of our application Serial No. 855,970, filed November 30, 1959, now abandoned.

This invention relates to a process for the preparation of water-dispersible fibrous alumina monohydrate powder, and is more particularly directed to a process for the preparation of such powder by autoclaving an aqueous slurry of water insoluble basic aluminum acetate and a water-soluble salt of a univalent base and a polyvalent acid, and then drying the slurry. This process can be either batch or continuous.

The product produced by this process has great utility since colloidal aluminas have very wide use in industry. A special advantage of the process of this invention is that one can produce a dry redispersible alumina powder therefrom.

The process enables one to prepare dry aluminas which are considerably more easily dispersible in water than those of the prior art by methods which are much less complex and costly than those previously used. The raw materials are abundant and cheap and the processing steps are direct and easily controlled, making possible the use of relatively simple equipment. In addition, the substantial contents of strong acids, such as nitrate and chloride, inherent in products of the prior art, which have deleterious effects in some uses, are avoided entirely.

As a starting material for the process, a water insoluble basic crystalline aluminum acetate is used, which can be represented by the formula:

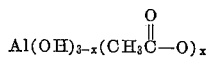

where $x$ is a positive number ranging from 1.8 to 2.2. By water insoluble is meant the acetate is soluble in less than 1% when stirred in water at room temperature. By crystalline is meant a material which will give a crystallogram.

As can be seen from the above formula, such basic aluminum acetate for use in the process of this invention should have an acetate to aluminum mole ratio ranging from 1.8:1 to 2.2:1, preferably from 1.9:1 to 2.1:1, with the most preferred mole ratio being about 2.0:1. However, partially hydrolyzed basic aluminum acetate rich in aluminum and low in acetic acid can be used. And, conversely, basic aluminum acetate may be admixed with acetic acid and then used. In such instances the acetate to aluminum mole ratio may be less than 1.8 or more than 2.2, but the major proportion of the starting material is still basic aluminum acetate with an $x$ of 1.8 to 2.2.

It is desirable that aluminum acetate for use in the process be as free of contaminants as possible. It is particularly desirable that the content of metals other than aluminum be below about 5%, by weight, and preferably below about 1%, by weight. Anions other than acetate or hydroxide should also be kept as low as possible.

Strong acid radicals (i.e. stronger than acetic) should preferably be excluded. In particular, polyvalent strong acid radicals such as sulfates, phosphates and others noted later as dispersibility-promoting additives must be kept below about 1% by weight.

The degree to which the basic aluminum acetate starting material is contaminated with inert materials such as silica or alumina is less important than is the case with ionizable salts; however, they will in most cases remain as inert, non-dispersible materials in the finished product and must therefore be kept below about 10%, by weight, in order to obtain a product which is at least 90% dispersible in water. Although materials such as silica are not commonly encountered in basic aluminum acetates, free alumina is often found as a result either of hydrolytic decomposition of the acetate or, more commonly, as a result of incomplete conversion of alumina in the original preparation of acetate. The most preferred starting material is basic aluminum acetate which is 99.8% acid soluble.

Water in aluminum acetate tends to render it unstable toward hydrolysis in storage and is therefore normally excluded. As previously stated, partially hydrolized aluminum acetate can be used in this process, and this is true whether or not it contains moisture. But the preferred starting material is dry crystalline basic aluminum acetate.

It has been found that the particle size or state of subdivision of the basic aluminum acetate is not critical; however, large lumps should if possible be excluded. It is preferred to use a pulverulent acetate with an ultimate average particle diameter in the range of 1–20 microns, as measured by the air-permeability method using a "Sub-Sieve Sizer" as described by Gooden and Smith, Ind. Eng. Chem., anal. ed. 12, 479 (1940).

Ordinarily, acetate particles are somewhat aggregated into larger clusters of particles. The degree to which this loose aggregation has occurred may easily by measured by means of standard sieves. For best results, acetates for use in the process of this invention should contain a minimum of aggregates larger than about 3 millimeters, which corresponds to a U.S. Standard Sieve of 6 meshes per inch. An acetate having less than about 25% of the particles retained on a 10-mesh sieve is preferred.

Basic aluminum acetate, of the above characteristics, can be prepared using any conventional procedures. However, a basic aluminum acetate, having the above-desired characteristics, which is particularly useful in this process, is that prepared according to the teachings of U.S. Patent 2,992,262.

As a second starting material is used what will be called a dispersibility promoter, which is a water-soluble salt derived from univalent basic materials and polyvalent acidic substances. Water soluble means that the salt dissolves in the aqueous reaction medium of the invention.

Inorganic cations derived from salts of the metals of Group IA of the Periodic Table of Elements and organic cations derived from substances like amines and ammonium, ethyl ammonium, trimethyl ammonium and tetramethyl ammonium are all suitable. However, for reasons of economy and convenience, the univalent cations of the alkali metals, ammonia, or the lower alkylamines are preferred and the cations of lithium, sodium, potassium and ammonium are especially preferred, since these cations provide the widest freedom of choice as to water-soluble, readily available salts with the preferred class of anions.

In choosing salts which are suitable as dispersibility promoters in the process, the selection of the anion portion is quite critical. It has been found that, in general, acidic materials which have only a single valence (e.g.

HNO₃, HCl, HClO₄) do not provide effective anions when they are added as alkali metal or ammonium salts. To be effective, the salt must be able to ionize into a polyvalent anion like that of sulfuric acid, SO₄⁼.

Examples of inorganic polyvalent anions include sulfate, sulfite, molybdate, carbonate, phosphate, phosphite, chromate, dichromate, vanadate, fluoroaluminate, arsenate, borate, ferrocyanide, ferricyanide, thiosulfate, dithionate and the like.

Examples of organic polyvalent anions include those of dicarboxylic acids and the like, such as oxalate, maleate, succinate, glutarate, adipate, and the like; those of tricarboxylic acids such as 2-hydroxy-1,2,3-propanetricarboxylic acid, citrate, and the like; those of tetracarboxylic acids; and those polyfunctional carboxylic acids such as citrate, tartrate, fumarate, acetonedicarboxylate, and the like. Organic polyvalent anions having molecular weights below about 600 appear to work most satisfactorily in this invention.

It has been found that the normal and acid salts of sulfuric acid, oxalic acid, citric acid, fumaric acid and phosphoric acid are especially suitable for the process. Of these, ammonium sulfate and sodium sulfate are most preferred.

The water used as a starting material for the processes of this invention need not be especially pure.

Of course, in areas where the water supply contains high levels of sulfate, this must be compensated for in calculating the amount of sulfate which is added later in the process.

It has been found that ordinary tap water, distilled water, and water demineralized with ion-exchange resins are all satisfactory.

The amount of basic aluminum acetate to be used is preferably from about 6% to about 52%, by weight of the desired hydrolysis batch, which is equivalent to from about 2 to about 16 weight percent Al₂O₃ content. The most preferred range is from 12% to 48% acetate (e.g. 4% to 15% Al₂O₃).

The amount of water-soluble salt should range from $0.05/v$ to $2.8/v$ moles per 100 moles of basic aluminum acetate present, where $v$ is the valence of the anion. The preferred range is from $.5/v$ to $2.2/v$ moles per 100 moles of basic aluminum acetate.

The balance of the hydrolysis charge is, of course, water. This may be added as such or it may be added partly as water and partly as a direct steam injection for heating the mixture to temperature.

The first step in the process is to mix the basic aluminum acetate, salt and water together in the prescribed proportions in any order. As will be seen in the examples hereinafter the aluminum acetate and salt can be mixed and then dissolved in water. Such procedure is particularly useful in a batch process. Also the salt can first be dissolved in water and then the acetate added to the solution as is also illustrated in the examples.

Next, the prepared mixture of basic aluminum acetate, salt, and water is heated under autogenous pressure at a temperature of more than about 140° C. for a time ranging from about 10 seconds to about 4 hours. A practical upper limit on temperature with existing process equipment and means of heating is about 220° C. As will be appreciated by those skilled in the art, the higher temperatures accelerate the hydrolysis reaction so that shorter times can be used. Thus, when operating in a batch process, it is preferred to operate with a 15 to 60-minute time at 160° C., but equally good results construed on the basis of dispersibility of the end product, can be achieved at 170° C. in 7 to 30 minutes. Indeed, it has been found that the time can be reduced by a factor of 2 for a 10° C. rise in autoclaving temperature, or doubled for a 10° C. decrease in temperature and equivalent results, based on equivalent dispersibility, will be obtained.

This holding time can be expressed by the following formula which is derived from the foregoing relationship:

$$\text{T min.} = 15 \times 2^{\frac{160 - °C.}{10}}$$

$$\text{T max.} = 60 \times 2^{\frac{160 - °C.}{10}}$$

where T= holding time in minutes.

At temperatures above 200° the reaction time is very difficult to measure accurately and allowance must be made for reaction occurring during heat-up and cooling.

When the hydrolysis is run in a continuous manner, as for example in a pipeline, it is preferably carried out at a temperature of from about 180° C. to about 220° C., with a holding time of about 10 seconds to about 4 minutes.

It is during the holding step that most of the hydrolysis of the basic aluminum acetate to alumina hydrate occurs.

Although it is preferred to raise to operating temperature as rapidly as possible, the heat-up time can be as much as 45% of the holding time without loss of dispersibility.

When conducting the process in a batch-wise manner, it is preferable that the heat-up time be about 6% of the total holding time. When a continuous process is used, the heat-up time is preferably 3% or less of the total holding time.

After this hydrolysis step, the resulting mixture is cooled below about 100° C. Cooling can be accomplished by any conventional means, as for example, by circulating water through the autoclave jacket. It is preferred to cool in the least possible time. Cooling below 50° C. is preferred when the product is to be drum dried as will be further illustrated in the examples.

The reaction mixture is then dried. When the process is run at low temperatures and low concentrations, the hydrolyzed product is preferably allowed to stand for one day, after which a clear layer is decanted off. Because dry products made at low temperatures and concentrations tend to lose their ability to disperse in water on storage, the sol is allowed to age for from 1 to 10 more days after decantation and before drying, to stabilize the product with respect to redispersibility. When the process is run at high temperatures and concentrations, or when the product is spray dried, the decanting and aging steps are not necessary and the hydrolyzed product can be dried directly.

In general the product of the heating or hydrolysis step can be dried by any conventional means. Thus, such conventional means, as spray, tray, drum, freeze, and other drying techniques, can be used.

In general, the product film temperatures on the drum-dryer should not be in excess of 140° C., and preferably not in excess of about 125° C. Drying times are, in general, determined by the particular drying method employed. In general, drying can be accomplished in conventional batch or continuous ways familiar to the art. However, since dispersibility is enhanced by minimum drying temperature and drying time, it is preferred to use a spray drying procedure.

Since it is preferred that short-drying times be employed, if rotary drum-dryers are used, the fibrous alumina sol is fed into the nip at such a rate that there is essentially no hold-up.

In a preferred embodiment, the process is a continuous one, with the raw ingredients being fed into one end of the apparatus train and the final product emerging from the other end. Apparatus can be conventional. A train consisting of a mixing tank, a pipeline reactor having suitable controls to regulate temperature and pressure, a cooling section, the proper pumps, and a drum-dryer or spray dryer has been found to be satisfactory.

It should be noted that if basic aluminum acetate by itself is hydrated, hydrolyzed, and dried by these process conditions in the absence of salt additives, the powders obtained are not so water dispersible as when salt additives are used.

Products of these processes are dry, white free-flowing powders of fibrous alumina monohydrate having the boehmite crystal lattice, more particularly described in Bugosh U.S. Patent 2,915,475, and useful for the same purposes described in that patent. The ultimate particles are largely in the colloidal range with a surface area ranging between about 200 and about 450 square meters per gram.

The surface area can be determined as by the nitrogen flow method outlined below. Using Houdry alumina catalyst (surface area 193±1 m.²/gm.) as a standard the procedure is:

(1) 0.300 gm. of standard are accurately weighed into a tared sample tube and are treated in the same manner as the samples.

(2) Weigh approximately 0.20 gm. of the product to be measured into a tared sample tube, and record the weight.

(3) Degas the sample and the standard in a vacuum oven at 160° C.±5° C. with 25 inches of vacuum using a pump. Degas for one hour. Release the vacuum by introducing helium into the oven slowly.

(4) Cap the tubes and place them in a desiccator to cool.

(5) Just prior to analysis, remove the caps and, with a suitable swab, remove any particles adhering to the sides of the tubes. Weigh the tubes accurately and record the weights.

(6) Attach the tube to a modified Fisher-Gulf Partitioner which has been set in following manner:

Detector temperature_____ 70°±0.5° C.
Bridge voltage_____ 20 milliamperes.
Attenuator_____ Range 5.
Gas_____ 10% $N_2$, balance He (37 cc./min.).
Recorder_____ M-H 1 mv. full scale, equipped with disc intergrator. Chart paper No. 9284 (M-H).

(7) After the instrument is equilibrated (as indicated by upscale drive and return of recorder pen), raise the flask containing liquid nitrogen around the tube. Allow enough time for equilibration (usually about 6–8 minutes). This is indicated by the recorder pen dropping below zero, then rising to a level of about 0.1 of a division on the chart.

(8) Lower the liquid nitrogen flask from the tube and record the number of units integrated as nitrogen is vaporized from the sample.

(9) Calculate the surface area according to the following formulae—

$$\text{Standard: } \frac{\text{Integrated units}}{\text{Weight} \times 193} = \text{``}K\text{''}$$

$$\text{Sample: } \frac{\text{Integrated units}}{\text{Weight} \times \text{``}K\text{''}} = \text{nitrogen surface area in m.}^2/\text{gm.}$$

The term "dispersible," as used in this application, means that according to the procedure outlined below, 90% of the alumina contained in the dry powder will colloidally disperse.

The procedure is:

(1) Tare a 40-ml. centrifuge tube to ±0.0001 gm.

(2) Add approximately 0.3 gm. of dry colloidal alumina to the tube and record the weight to ±0.0001 gm.

(3) Add sufficient distilled water to the tube such that the resulting mixture contains one percent $Al_2O_3$ by weight.

(4) Stopper the tube, and shake vigorously for 30 minutes on a "wrist-action" shaker.

(5) Centrifuge for 15 minutes at 1200 r.p.m. such that the mean radius of curvature is 5½ inches.

(6) Decant the supernatant and dry the residue at 150° C. under 20 inches vacuum for 45 minutes. Place tube in desiccator, allow to cool and then weigh to ±0.0001 gm.

(7) Calculate the dispersibility according to the formula $$\text{Percent non-dispersible alumina} = \frac{(\text{wt. percent } Al_2O_3 \text{ in residue})}{(\text{wt. percent } Al_2O_3 \text{ in dry powder})}$$

$$= \frac{(\text{wt. of residue})}{(\text{wt. of dry powder})} \times 100$$

Dispersibility = 100 − percent non-dispersible

This invention is further illustrated by the following examples:

Example 1

The apparatus consists of a one-cubic foot, horizontal, 316 stainless steel, agitated autoclave containing a "ribbon blender" type agitator. Forty-two pounds of tap water and 41.3 gms. of anhydrous ammonium sulfate are charged to the autoclave and the temperature is adjusted to 30±1° C. Nine and three-tenths pounds of basic aluminum acetate made by the process of U.S. Patent 2,992,262 are added, and the mass is agitated for 10 minutes at 50 r.p.m. Steam from a saturated source (140 p.s.i.g.) is sparged into the autoclave such that a temperature of 160° C. is attained in 8 minutes. The mass is held at 160° C. for 20 minutes with agitation at 50 r.p.m. It is then cooled to about 30° C., aged for 4 days, the supernatant liquid is decanted and the remaining slurry is drum-dried on a valley feed, twin roll, drum-dryer at 120° C., rotating at 2 r.p.m.

The dry product is 97.4% dispersible in water. The dispersibility remains above 95% for at least 1 year.

Example 2

The apparatus consists of a 1.8 liter, vertical, 316 stainless steel, agitated autoclave. One hundred and seventy-two gms. of basic aluminum acetate are mixed with 1.85 gms. of anhydrous sodium sulfate. The mixture is placed in the autoclave and agitated at 160 r.p.m. for 10 minutes. Eleven hundred and fifty gms. of superheated water (160° C.) are injected into the autoclave in two minutes. The temperature is adjusted to 160° C. with jacket steam. The reaction mass is held at 160° C. for one hour, with a 160 r.p.m. agitation rate. The reaction mass is cooled to 27° C. in 11 minutes by jacket cooling. The sol is then aged 10 days at room temperature, and then drum dried under the conditions in Example 1. The dispersibility of the dry product in water is 96.1%.

Example 3

The apparatus consists of a glass polymer tube of about 125 cc. capacity, to which is added 4.29 gms. of basic aluminum acetate, 23.06 mls. distilled water and 2.65 mls. of 0.1 M sodium bioxalate. The tube is sealed and placed in a steam-heated, rocking autoclave, which uses water as the heat-transfer medium. The tube is heated to 160° C. in 8 minutes, and held for 30 minutes at temperature. The system is cooled as rapidly as possible to 30° C. with cooling water. The tube is removed from the autoclave and opened, and the contents dried on a glass plate at 90° C. The dispersibility of the dry powder in water is 98%.

Example 4

The apparatus is the same as Example 3. The charge of basic aluminum acetate is such that the $Al_2O_3$ content is 4.5 weight percent in a water slurry. The following salts are added in separate runs at a concentration of one mole per 100 moles of aluminum acetate present:

Sodium oxalate
Ammonium oxalate
Sodium citrate
Disodium phosphate
Diammonium phosphate The autoclaving and drying conditions are as in Example 3. The dispersibility of all the dried products in water is in the range of 95% to 100%.

Example 5

The apparatus for both hydrolysis and drying is the same as Example 3. The $Al_2O_3$ level is 4.5 weight percent in a water slurry. Sodium fumarate is added at a concentration of 1.25 moles per 100 moles of aluminum acetate present.

The autoclaving conditions are as in Example 3. The dispersibility of the dried product in water is in the range of 90% to 100%.

Example 6

Equipment is the same as in Example 2. Three hundred and six grams of basic aluminum acetate are slurried with 642 mls. of water, and 2.50 gms. ammonium sulfate. The reaction mass is heated to 160° C. in 3 minutes by direct steam sparging, and then further heated to 180° C. by jacket heating. Heating to 180° C. requires an additional 30 minutes. The sol is quenched in 7 minutes to room temperature after it reaches 180° C. It contains 9.2 weight percent $Al_2O_3$. The sol is aged for 4 days at 23° C. and then drum dried. The dried product has a dispersibility of 96% in water.

Example 7

The apparatus consists of an 8-gallon slurry mix tank mounted on a scale; a positive displacement pump; a steam injection point located at the discharge of the pump; a length of traced and insulated ¾" stainless steel pipe; a multitube, single pass, water-cooled heat exchanger; and two 2.5 gallon receivers.

A 43%, by weight, basic aluminum acetate aqueous slurry containing 1.16 moles of ammonium sulfate per 100 moles of aluminum acetate present is mixed in the slurry mix tank and agitated for at least 30 minutes before introducing the slurry to the pipeline.

Pipeline conditions are adjusted to a pressure of 250 p.s.i.g. and a temperature of 200° C. while pumping water into the pipeline. Receivers are alternately charged and discharged.

When the pipeline conditions reach equilibrium, feed to the pump is changed from water to slurry. Process conditions are maintained at 250 p.s.i.g. at 200° C. throughout the run. Residence time at these conditions is about 4 minutes.

The temperature of the product as it leaves the heat exchanger is controlled at 125° C. The material is then cooled, fed to a drum-dryer and dried under standard drying conditions. The dispersibility of the dry powder in water is 96.1%.

Example 8

The equipment consists of a 30-gallon tank, a positive displacement pump, a steam injection point at the discharge of the pump, a length of ¾" stainless steel pipe, primary and secondary single-tube water-cooled heat exchangers, and a pressure reducing valve which discharges the product directly to the drum-dryer.

A 30%, by weight, basic aluminum acetate aqueous slurry containing 0.30 mole of ammonium sulfate per 100 moles of aluminum is mixed in the slurry-mix tank and agitated for at least 30 minutes before introducing the slurry to the pipeline.

Pipeline conditions are adjusted to a pressure of 310 p.s.i.g. at a temperature of 210° C. while pumping water into the pipeline. When pipeline conditions reach equilibrium, feed to the pump is changed from water to slurry.

The slurry is heated to a temperature of 210° C. by steam injection in one and one-half seconds, using 0.45 pound of steam per pound of slurry. The residence time at this temperature is approximately 0.9 minute.

The slurry is cooled to approximately 100° C. in about 30 seconds in the primary heat exchanger and is then cooled to about 40° C. in the secondary heat exchanger.

The pressure is then reduced as the reaction mass is released through a let-down valve. The mass is fed to the drum-dryer, where it is dried to a water content of about 5%. This partially dried product is then passed into a heated fluidized bed dryer, where it is further dried to a water content of about 3%.

This dry product is then screened through a 40-mesh screen to give a powder which is 96% redispersible.

Example 9

The equipment consists of a 30-gallon tank and a 40-gallon tank; two centrifugal pumps; a positive displacement pump; a steam injection point at the discharge of the positive displacement pump; a length of 1" stainless steel pipe; a primary, single-tube, water-cooled, circulating cooler with pump; a secondary, single-tube, water-cooled cooler; and two pressure control valves.

A 33% by weight basic aluminum acetate aqueous slurry containing 0.30 mole of ammonium sulfate per 100 moles of aluminum is mixed in the slurry-mix tanks, as in Example 8.

Pipeline conditions are adjusted as in Example 8.

The slurry is heated to a temperature of 210° C. by steam injection in one and one-half seconds, using 0.45 pound of steam per pound of slurry. The residence time at this temperature is approximately 1.3 minutes.

The pressure of the reaction mass is partially reduced as it is cooled to approximately 80° C. by injection into the primary cooler and is then further cooled to about 40° C. in the secondary cooler.

The pressure is then reduced as the reaction mass is released through a let-down valve. The mass is fed to the drum dryer where it is dried to a water content of about 5%. This partially dried product is then passed into a heated fluidized bed dryer, where it is further dried to a water content of about 3%.

This dry product is then screened through a 40 mesh screen to give a powder which is 96% redispersible.

Example 10

The apparatus is the same as in Example 1. The starting material is basic aluminum acetate made by the process of U.S. Patent 2,992,262, except that calculations based on analyses of the aluminum and carbon levels show the acetate to aluminum mole ratio to be 1.82/1 rather than the preferred 2/1. Forty-two pounds of distilled water and 48.2 gms. of anhydrous ammonium sulfate are mixed and charged to the autoclave. Nine and three-tenths pounds of the above-mentioned basic aluminum acetate are added and the mixture is agitated for 35 minutes at 50 r.p.m. Heating to 160° C is accomplished as in Example 1. The mass is held at 160° C. for 45 minutes. Cooling, aging, and decanting are accomplished as in Example 1. The remaining slurry is dried in a spray dryer with inlet air temperature of 300° C. and exit temperature of 125° C.

The dry product is 92% dispersible in water. The specific surface area, as measured by the nitrogen flow method, is 243 m.²/gm.

*Example 11*

The equipment consists of a 30-gallon tank and a 40-gallon tank; two centrifugal pumps; a positive displacement pump; a steam injection point at the discharge of the positive displacement pump; a length of 1″ stainless steel pipe; a primary, single-tube, water-cooled, circulating cooler with pump; a secondary, single-tube, water-cooled cooler; and two pressure control valves.

A 30%, by weight, basic aluminum aqueous slurry, containing 0.3 mole of ammonium sulfate per 100 moles of basic aluminum acetate present, is mixed in the two slurry tanks. Analyses of the aluminum and carbon levels of the basic aluminum acetate show this material to have the preferred acetate to aluminum mole ratio of 2.0; the basic aluminum acetate is 99.92% acid soluble which also indicates a high purity.

Pipeline conditions are adjusted to a pressure of 320 p.s.i.g. at a temperature of 212° C. while pumping water into the pipeline. When conditions reach equilibrium, feed to the pump is changed from water to slurry. Direct steam injection heats the slurry from room temperature to 212° C. in 1½ seconds. The residence time at 212° C. is 1.3 minutes.

The pressure of the reaction mass is partially reduced as it is cooled to approximately 80° C. by injection into the primary cooler and is then further cooled to about 40° C. in the secondary cooler.

The hydrolyzed slurry is dried in a spray dryer with inlet air temperature of 350° C. and exit temperature of 115° C.

The dry powder, screened through a 40-mesh screen, is 99.3% dispersible in water. The dispersibility remains above 99% for at least 1 year. The specific surface area, as measured by the nitrogen flow method, is 287 m.²/gm.

*Example 12*

The apparatus is the same as Example 2. Sixty-seven gms. of basic aluminum acetate are mixed with 0.66 grams of anhydrous ammonium sulfate. Analyses of the basic aluminum acetate, prepared by the process of U.S. Patent 2,992,262, shows the acetate to aluminum mole ratio to be about 2.2 to 1. The mixture is placed in the autoclave and agitated at 160 r.p.m. for 10 minutes. One thousand and fifty grams of superheated water (160° C.) are injected into the autoclave in two minutes. The temperature is adjusted to 160° C. with jacket steam. The reaction mass is held at 160° C. for 3½ hours, with 160 r.p.m. agitation. The reaction mass is cooled by jacket cooling and dried on a glass plate at 90° C.

The dry product is 94% dispersible in water. The specific surface area is 265 m.²/gm.

*Example 13*

The apparatus is the same as Example 1 except the "ribbon blender" type agitator has been replaced by a "kneader" type agitator. Thirty-nine pounds of basic aluminum acetate made by the process of U.S. Patent 2,992,262 are mixed with 201 grams of anhydrous ammonium sulfate and charged to the autoclave. The agitator is rotating at 4 r.p.m. Thirty-seven pounds of superheated water (160° C.) are injected into the autoclave in 2½ minutes. The temperature is adjusted to 160° C. and the mass is held at 160° C. for 3½ hours with agitation at 4 r.p.m. It is then cooled to about 30° C. and dried as in Example 1.

The dry product is 91.5% dispersible in water. The specific surface area, as measured by the nitrogen flow method, is 224 m.²/gm.

*Example 14*

The apparatus is the same as Example 11.
The slurry is the same as Example 11.

Pipeline conditions are adjusted to a pressure of 350 p.s.i.g. at a temperature of 217° C. while pumping water through the pipeline. When conditions reach equilibrium, feed to the pump is changed from water to slurry. The residence time at 217° C. is ten seconds.

The reaction mass is cooled and spray dried as in Example 11.

The dry powder is 93.5% dispersible in water. After one year, the dispersibility remains above 92%. The specific surface area, as measured by the nitrogen flow method, is 368 m.²/gm.

The embodiments of the invention in which an exclusive property or privilege is claimed are:

1. A process for the preparation of a water-dispersible fibrous alumina monohydrate, said process comprising continuously
   (a) admixing 6% to 52%, by weight, of a basic aluminum acetate having the formula

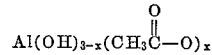

where $x$ is a number from 1.8 to 2.2, with a water-soluble salt of a univalent base and an acid selected from the group consisting of sulfuric, oxalic, citric, fumaric and phosphoric, at a concentration of from $0.05/v$ to $2.8/v$ moles per 100 moles of aluminum acetate present where $v$ is the valence of the anion, and water;
   (b) heating said mixture for from 10 seconds to 4 hours at a temperature of from 140° C. to 220° C. to form a sol;
   (c) cooling said sol; and then
   (d) drying said sol.

2. A process for the preparation of a water-dispersible fibrous alumina monohydrate, said process comprising
   (a) admixing 6% to 52%, by weight, of a basic aluminum acetate having the formula

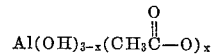

where $x$ is a number from 1.8 to 2.2, with a water-soluble salt of a univalent base and an acid selected from the group consisting of sulfuric, oxalic, citric, fumaric and phosphoric, at a concentration of from $0.05/v$ to $2.8/v$ moles per 100 moles of aluminum acetate present, where $v$ is the valence of the anion and water;
   (b) heating said mixture for from 10 seconds to 4 hours, at a temperature of from 140° C. to 220° C. to form a sol;
   (c) aging said sol from 1 to 10 days; and
   (d) drying said sol.

3. The process of claim 1 wherein the water-soluble salt is ammonium sulfate.

4. In a process for the preparation of water-dispersible fibrous alumina monohydrate said process comprising
   (a) admixing 6% to 52%, by weight, of a basic aluminum acetate having the formula

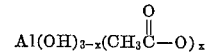

where $x$ is a number from 1.8 to 2.2, with a water-soluble salt of a univalent base and an acid selected from the group consisting of sulfuric, oxalic, citric, fumaric and phosphoric, at a concentration of $0.05/v$ to $2.8/v$ moles per 100 moles of aluminum acetate present, where $v$ is the valence of the anion, and water;
   (b) heating said mixture for from 10 seconds to 4 hours at a temperature of from 140° C. to 220° C. to form a sol; and then
   (c) drying said sol; the step of aging said sol from 1 to 10 days after heating but before drying said sol.

5. A process for the preparation of a water-dispersible fibrous aluminum monohydrate, said process comprising continuously (a) admixing 12% to 48% by weight, of a basic aluminum acetate having the formula $$Al(OH)_{3-x}(CH_3\overset{\overset{O}{\|}}{C}-O)_x$$

where $x$ is 2, with a water-soluble salt of a univalent base and sulfuric acid at a concentration of from $.5/v$ to $2.2/v$ moles per 100 moles of aluminum acetate present, where $v$ is the valence of the anion, and water;

(b) heating said mixture for from 30 seconds to 4 minutes at a temperature of from 180° C. to 220° C. to form a sol;

(c) cooling and drying said sol.

References Cited by the Examiner
UNITED STATES PATENTS

| | | |
|---|---|---|
| 2,898,306 | 8/59 | Cramer et al. |
| 2,915,475 | 12/59 | Bugosh _____ 23—141 X |
| 3,031,418 | 4/62 | Bugosh _____ 23—141 X |

MAURICE A. BRINDISI, *Primary Examiner.*